United States Patent
Yang

(10) Patent No.: US 12,052,738 B2
(45) Date of Patent: Jul. 30, 2024

(54) METHOD AND APPARATUS FOR MEASURING SIDELINK

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 325 days.

(21) Appl. No.: 17/612,508

(22) PCT Filed: May 20, 2019

(86) PCT No.: PCT/CN2019/087663
§ 371 (c)(1),
(2) Date: Nov. 18, 2021

(87) PCT Pub. No.: WO2020/232614
PCT Pub. Date: Nov. 26, 2020

(65) Prior Publication Data
US 2022/0264583 A1    Aug. 18, 2022

(51) Int. Cl.
*H04W 24/10* (2009.01)
*H04W 72/02* (2009.01)
(Continued)

(52) U.S. Cl.
CPC ......... *H04W 72/541* (2023.01); *H04W 72/02* (2013.01); *H04W 72/0453* (2013.01); *H04W 92/18* (2013.01)

(58) Field of Classification Search
CPC ...... H04L 1/0026; H04W 4/021; H04W 4/40; H04W 24/08; H04W 4/70; H04W 24/10;
(Continued)

(56) References Cited

U.S. PATENT DOCUMENTS 10,237,874 B2 * 3/2019 Mok ................. H04W 36/0072
11,503,604 B2 * 11/2022 Hahn ..................... H04W 8/02
(Continued)

FOREIGN PATENT DOCUMENTS

WO    WO 2018129968 A1    7/2018

OTHER PUBLICATIONS

PCT/CN2019/087663 English translation of the International Search Report dated Feb. 19, 2020.

*Primary Examiner* — Frank Duong
(74) *Attorney, Agent, or Firm* — Cozen O'Connor

(57) ABSTRACT

A direct communication link measurement method and apparatus, a device, and a storage medium, pertaining to the field of communications. The method comprises: an access network device sending area measurement information to a terminal; the terminal receiving the area measurement information; when located in an area corresponding to an area identifier, the terminal measuring, at a corresponding frequency, a direct communication link resource, and acquiring a measurement result; the terminal reporting the area identifier and the measurement result to the access network device; the access network device receiving the area identifier and the measurement result; and the access network device configuring, according to the measurement result, the direct communication link resource in the area corresponding to the area identifier.

18 Claims, 4 Drawing Sheets

(51) Int. Cl.
*H04W 72/0453* (2023.01)
*H04W 72/541* (2023.01)
*H04W 92/18* (2009.01)

(58) Field of Classification Search
CPC ......... H04W 28/0284; H04W 28/0289; H04W 48/12; H04W 52/36; H04W 72/02; H04W 72/0453; H04W 72/23; H04W 72/541; H04W 76/14; H04W 92/18; H04W 88/02; Y02D 30/70
See application file for complete search history.

(56) References Cited

U.S. PATENT DOCUMENTS

| | | | | |
|---|---|---|---|---|
| 11,832,153 | B2* | 11/2023 | Hwang ................ | H04W 48/12 |
| 2018/0124771 | A1* | 5/2018 | Mok .................... | H04W 72/51 |
| 2021/0314796 | A1* | 10/2021 | Hoang ................. | H04W 52/36 |
| 2021/0409990 | A1* | 12/2021 | Wang .................. | H04W 24/10 |

* cited by examiner

METHOD AND APPARATUS FOR MEASURING SIDELINK

CROSS-REFERENCE TO RELATED APPLICATION

This application is the US national phase application of International Application No. PCT/CN2019/087663, filed on May 20, 2019, the entire contents of which are incorporated herein by reference.

TECHNICAL FIELD

The disclosure relates to a field of communication technologies, and more particularly to a method and an apparatus for measuring a sidelink, a device and a storage medium.

BACKGROUND

Vehicle to everything (V2X) realizes sidelink between two terminals. Sending resources are shared among different terminals in the sidelink.

In order to prevent terminals close to each other from selecting a same sidelink resource, an access network equipment divides a cell into multiple zones. The terminal may determine which zone it is located in, and then select a sidelink resource in a corresponding resource pool for sidelink transmission.

SUMMARY

In an aspect, there is provided a method for measuring a sidelink. The method includes: receiving, by a terminal, zone measurement information sent by an access network equipment, in which the zone measurement information comprises a zone identifier and a frequency; measuring, by the terminal, a sidelink resource at a corresponding frequency to obtain a measurement result when the terminal is located in a zone corresponding to the zone identifier; and reporting, by the terminal, the measurement result and the zone identifier to the access network equipment.

In another aspect, there is provided a method for measuring a sidelink. The method includes: sending, by an access network equipment, zone measurement information to a terminal, in which the zone measurement information comprises a zone identifier and a frequency; receiving, by the access network equipment, a measurement result and the zone identifier sent by the terminal, in which the measurement result is obtained by the terminal measuring a sidelink resource at a corresponding frequency when located in a zone corresponding to the zone identifier; and performing, by the access network equipment, configuration on the sidelink resource in the zone corresponding to the zone identifier based on the measurement result.

In another aspect, there is provided a terminal. The terminal includes: a processor and a transceiver. The transceiver is connected to the processor. The processor is configured to load and execute executable instructions to implement the method for measuring a sidelink described above.

In another aspect, there is provided a base station. The base station includes: a processor and a transceiver. The transceiver is connected to the processor. The processor is configured to load and execute executable instructions to implement the method for measuring a sidelink described above.

BRIEF DESCRIPTION OF THE DRAWINGS

In order to more clearly to explain technical solutions of embodiments of the disclosure, drawings required to be used in description of embodiments of the disclosure is simply introduced below. Apparently, the drawings in the following description are merely embodiments of the disclosure. For the ordinary skilled in the art, other drawings may be obtained based on these drawings without any creative work.

DETAILED DESCRIPTION

In order to enable a purpose, a technical solution and advantages of the disclosure clearer, description will be made in detail below to embodiments of the disclosure with reference to accompanying drawings.

In order to prevent user equipments (UEs) with a close distance from selecting a same sidelink resource, the base station may divide a cell into multiple zones. The UE may determine which zone it is located in, and then select a corresponding resource pool for sidelink transmission.

A network side carries configuration information of the zone in a broadcast message, including a length, a width and a reference point. The network side may allocate different sidelink resource pools for respective zones.

The UE may sense and measure the sidelink resource to obtain a channel busy ratio (CBR).

The number of vehicles and services are different in different zones, and the number of vehicles and services in the same zone may also change. However, presently, the network may not obtain a CBR measurement result of a certain zone, and may only allocate a static resource pool to the zone, which is inconsistent with a business requirement and may cause waste or congestion of resources.

Figure 1:
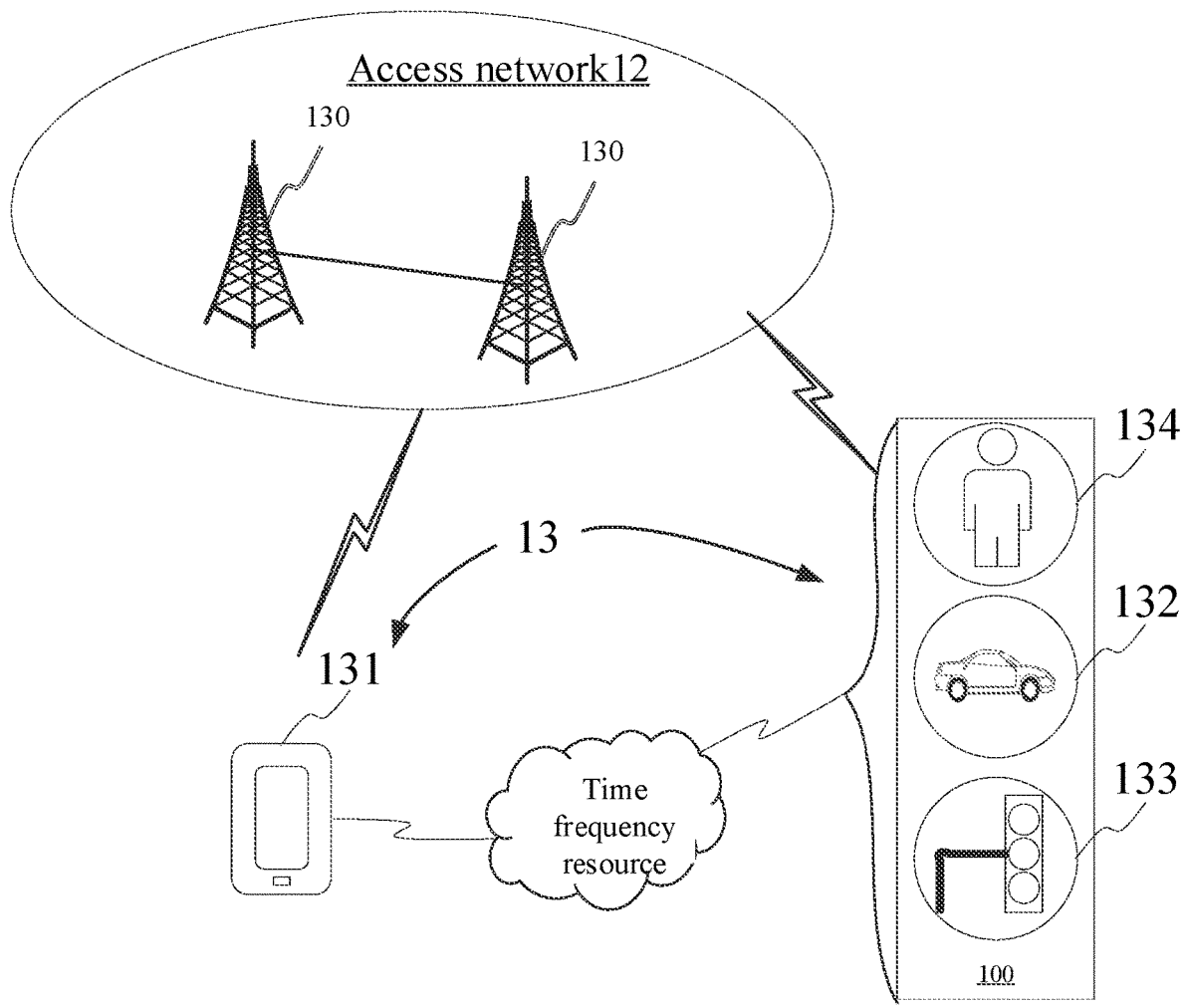
FIG. 1 is a schematic diagram illustrating a communication system according to an embodiment of the disclosure.

FIG. 1 is a schematic diagram illustrating a communication system supporting a sidelink according to an embodiment of the disclosure. The communication system may include an access network 12 and a terminal 13.

The access network 12 includes multiple access network equipments 120. The access network equipment 120 may be a base station. The base station is a device deployed in the access network and is configured to provide a wireless communication function for the terminal. The base station may include various forms of macro base stations, micro base stations, relay stations, access points and the like. Names of a device with a base station function may be different in systems with different wireless access technologies. For example, the device is called eNodeB or eNB in a long term evolution (LTE) system, and the device is called gNodeB or gNB in a 5G new radio (NR) system. With development of communication technologies, the name "base station" may be described and change. For convenience, in embodiments of the disclosure, the above devices for providing the wireless communication function for the terminal are collectively referred to as the access network equipment.

The terminal 13 may include various handheld devices, vehicle-mounted devices, wearable devices and computing devices having the wireless communication function, other processing devices connected to a wireless modem, various forms of UEs, mobile stations (MS), terminal devices, and the like. For convenience of description, the above devices are collectively referred to as terminal. The access network equipment 120 communicates with the terminal 13 through some air interface technologies, such as a Uu interface.

In embodiments of the disclosure, the terminal 13 includes: a vehicle 131, another vehicle 132, an infrastructure 133 and a pedestrian 134.

Vehicle to vehicle (V2V) refers to a communication between the vehicle 131 and the other vehicle 132. The vehicle sends its own related information to another vehicle. The related information includes a driving velocity, a geographical location, a driving direction, a driving state, and the like.

The vehicle to infrastructure (V2I) refers to a communication between the vehicle 131 and the infrastructure 133. The infrastructure 133 includes all infrastructures encountered during running of the vehicle, including a building facility such as a traffic light, a bus stop, a building, and a tunnel.

Vehicle to pedestrian (V2P) refers to a communication between the vehicle 131 and the pedestrian 134. The pedestrian generally refers to a pedestrian carrying an electronic device with a mobile communication capability, such as a mobile phone or a wearable device. The wearable device includes a smart bracelet, a smart watch and a smart ring.

In embodiments of the disclosure, the vehicle 131 is referred to as first terminal, and the vehicle 132, the infrastructure 133 and the pedestrian 134 are referred to as second terminal for illustration, but the first terminal and the second terminal may also exchange roles, which is not limited.

Alternatively, both the first terminal and the second terminal are terminals supporting the sidelink, and the communication system may be the NR system or a subsequent evolution system.

Figure 2:
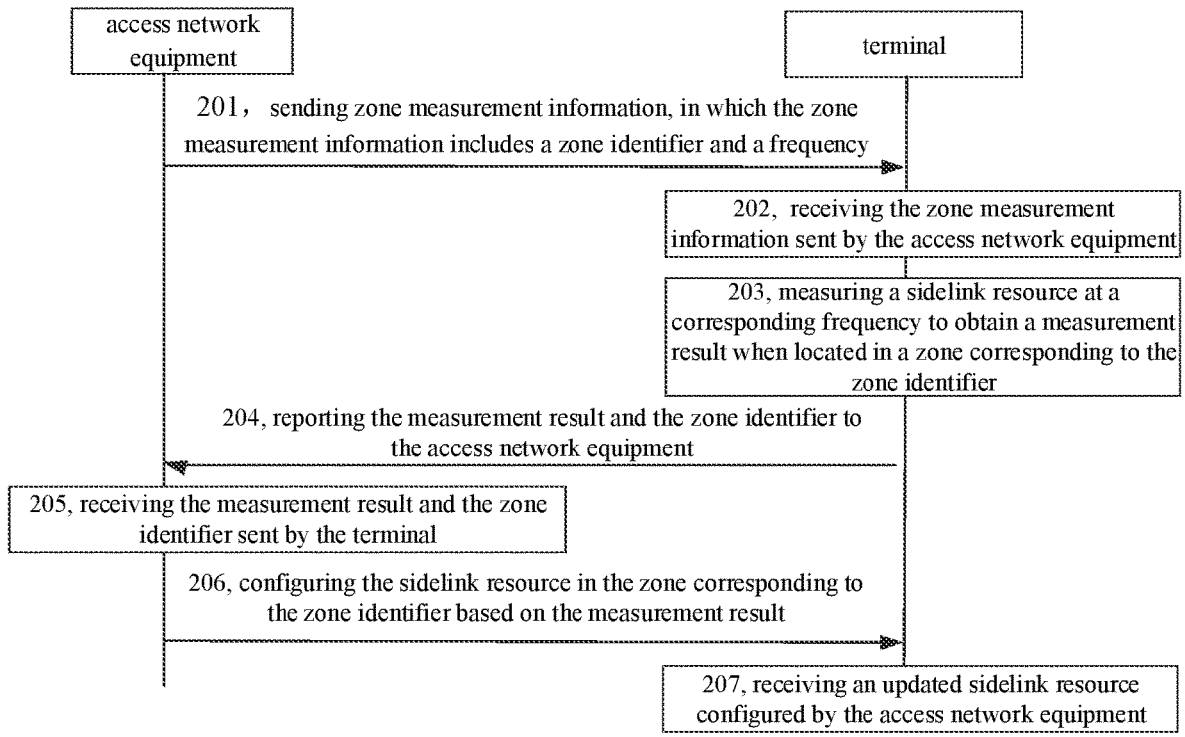
FIG. 2 is a flow chart illustrating a method for measuring a sidelink according to an embodiment of the disclosure.

FIG. 2 is a flow chart illustrating a method for measuring a sidelink according to an embodiment of the disclosure. This embodiment takes that the method is applied to the communication system illustrated in FIG. 1 as example for illustration. The method includes the following.

At block 201, an access network equipment sends zone measurement information to a terminal. The zone measurement information includes a zone identifier and a frequency.

At block 202, the terminal receives the zone measurement information sent by the access network equipment. The zone measurement information includes the zone identifier and the frequency.

At block 203, the terminal measures a sidelink resource at a corresponding frequency to obtain a measurement result when located in a zone corresponding to the zone identifier.

Exemplarily, the access network equipment configures a sidelink resource pool to each zone in advance. The resources in the sidelink resource pool are resources for sidelink.

At block 204, the terminal reports the measurement result and the zone identifier to the access network equipment.

At block 205, the access network equipment receives the measurement result and the zone identifier sent by the terminal. The measurement result is configured to indicate a usage of the sidelink resource.

The measurement result is obtained by the terminal measuring a sidelink resource at the corresponding frequency when located in a zone corresponding to the zone identifier.

At block 206, the access network equipment configures the sidelink resource in the zone corresponding to the zone identifier based on the measurement result.

Exemplarily, when the measurement result is configured to indicate that a resource usage in the sidelink resource pool is relatively congested (for example, the CBR is greater than the first threshold), available resources in the sidelink resource pool are increased. When the measurement result is configured to indicate that the resource usage in the sidelink resource pool is relatively idle (for example, the CBR is less than the second threshold), the available resources in the sidelink resource pool are reduced.

At block 207, the terminal receives an updated sidelink resource configured by the access network equipment.

In conclusion, with the method according to this embodiment, the sidelink resource in the zone is measured by the terminal, and the measurement result is reported to the access network equipment, such that the access network equipment may dynamically adjust the sidelink resource pool based on the measurement result, and the sidelink resource pool in each zone may be dynamically adjusted based on the number of vehicles and service types in the zone. In this way, problems of resource waste and congestion because the sidelink resource in the resource pool configured for each zone is fixed and the resource configuration may be inconsistent with the service requirement in the related art are solved.

Figure 3:
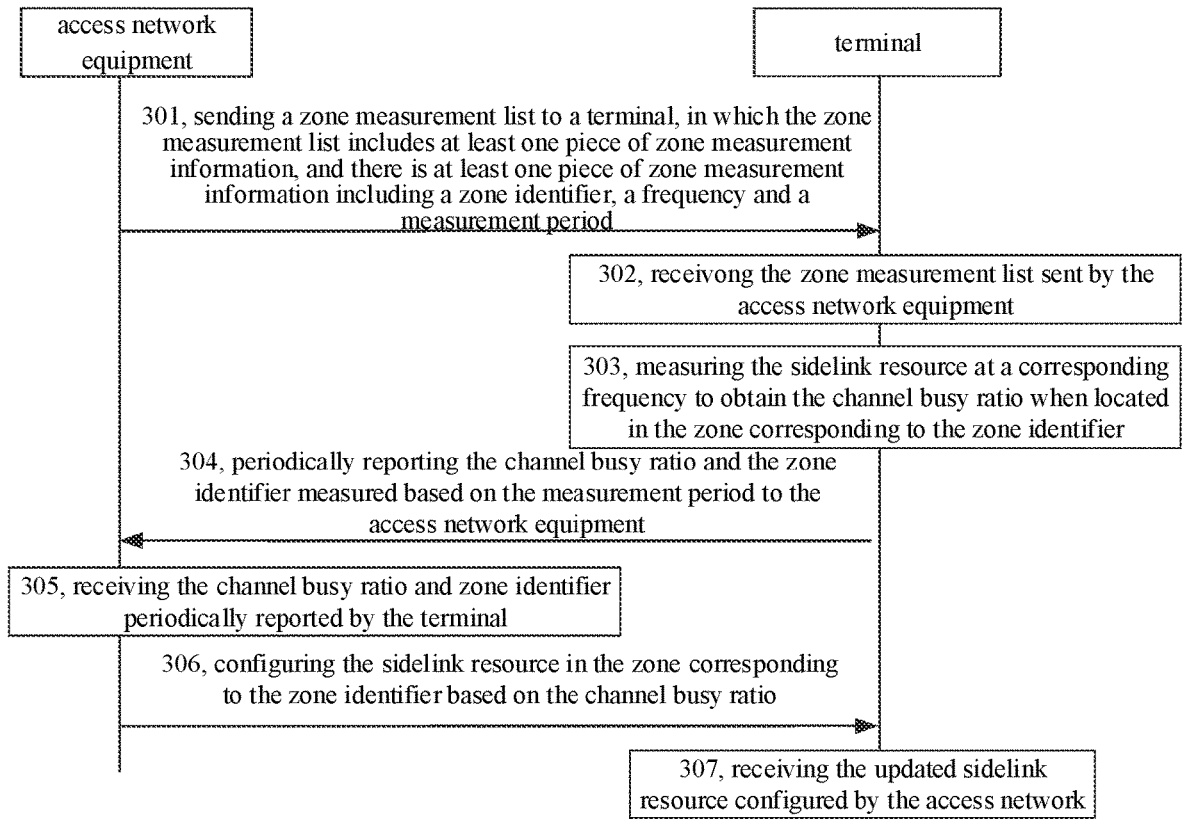
FIG. 3 is a flow chart illustrating a method for measuring a sidelink according to another embodiment of the disclosure.

FIG. 3 is a flow chart illustrating a method for measuring a sidelink according to an embodiment of the disclosure. This embodiment takes that the method is applied to the communication system illustrated in FIG. 1 as example for illustration. The method includes the following.

At block 301, an access network equipment sends a zone measurement list to a terminal. The zone measurement list includes at least one piece of zone measurement information. There is at least one piece of zone measurement information including a zone identifier, a frequency and a measurement period.

The zone measurement list includes n pieces of zone measurement information, where n is an integer greater than 1. Each piece of zone measurement information includes: a zone identifier and a frequency band. Alternatively, at least one of the n pieces of zone measurement information also includes a measurement period.

The measurement period is configured to indicate a period for measuring the sidelink resource. For example, the measurement period is 10 milliseconds. Table 1 illustrates an example of the zone measurement list.

TABLE 1

| Zone identifiers | Frequencies | Measurement periods |
|---|---|---|
| Zone 1 | Frequency 1 | 10 ms |
| Zone 1 | Frequency 2 | 20 ms |

Alternatively, the access network equipment sends the zone measurement list to the terminal via a reconfiguration message.

At block 302, the terminal receives the zone measurement list sent by the access network equipment. The zone measurement list includes at least one piece of zone measurement information. There is at least one piece of zone measurement information including the zone identifier, the frequency and the measurement period.

Alternatively, the terminal receives the reconfiguration message sent by the access network equipment, and obtains the zone measurement list from the reconfiguration message.

At block 303, the terminal measures the sidelink resource at a corresponding frequency to obtain the channel busy ratio when located in the zone corresponding to the zone identifier.

As an example of this embodiment, the terminal obtains the zone configuration information of each zone from a broadcast message in advance, in which the zone configuration information includes a length, a width and a reference point.

The terminal obtains a geographical position of itself, and determines whether the geographical position of itself is located in a zone indicated by the zone configuration information. The terminal measures the sidelink resource to obtain the CBR when it is located in the zone. The terminal does not measure the sidelink resource when it is not located in the zone.

Alternatively, a global navigation satellite system (GNSS) is installed in the terminal. The terminal determines its own geographical position by using the GNSS. The GNSS includes the global positioning system (GNSS) of the United States, the Beidou system of China, the Grenas system of Russia, the Galileo system of the European Union, etc., which is not limited in embodiments of the disclosure.

The terminal performs channel measurement on the sidelink resource at the frequency corresponding to the zone to obtain the channel busy ratio.

At block 304, the terminal periodically reports the zone identifier and the channel busy ratio measured based on the measurement period to the access network equipment.

The terminal measures the channel busy ratio once every 10 ms, and then reports the measured channel busy ratio and the zone identifier to the access network equipment based on the same period (such as every 10 ms).

At block 305, the access network equipment receives the channel busy ratio and zone identifier periodically reported by the terminal.

At block 306, the access network equipment configures the sidelink resource in the zone corresponding to the zone identifier based on the channel busy ratio.

Exemplarily, when the measurement result is configured to indicate that the resource usage in the sidelink resource pool is congested (for example, the CBR is greater than the first threshold), the available resource in the sidelink resource pool is increased. When the measurement result is used to indicate that the resource usage in the sidelink resource pool is relatively idle (for example, the CBR is less than the second threshold), the available resource in the sidelink resource pool is reduced.

After the sidelink resource in the zone is adjusted, the access network equipment updates the configuration information of the sidelink resource pool to each terminal in the zone by using the broadcast message. That is, the access network equipment configures the updated sidelink resource pool to the terminal.

At block 307, the terminal receives the updated sidelink resource configured by the access network.

In conclusion, with the method according to this embodiment, by the terminal measuring the sidelink resource in the zone, and reporting the measurement result to the access network equipment, the access network equipment may dynamically adjust the sidelink resource pool based on the measurement result, such that the sidelink resource pool in each zone may be dynamically adjusted based on the number of vehicles and service types in the zone. In this way, problems of resource waste and congestion because the sidelink resource in the resource pool configured for each zone is fixed and the resource configuration may be inconsistent with the service requirement in the related art are solved.

With the method provided in this embodiment, the CBR in the zone is also reported to the access network equipment in a periodic reporting manner, such that the access network equipment may periodically know the resource usage in the sidelink resource pool in the zone, thereby dynamically increasing/decreasing the resources in the sidelink resource pool in the zone and improving the resource utilization rate.

Figure 4:
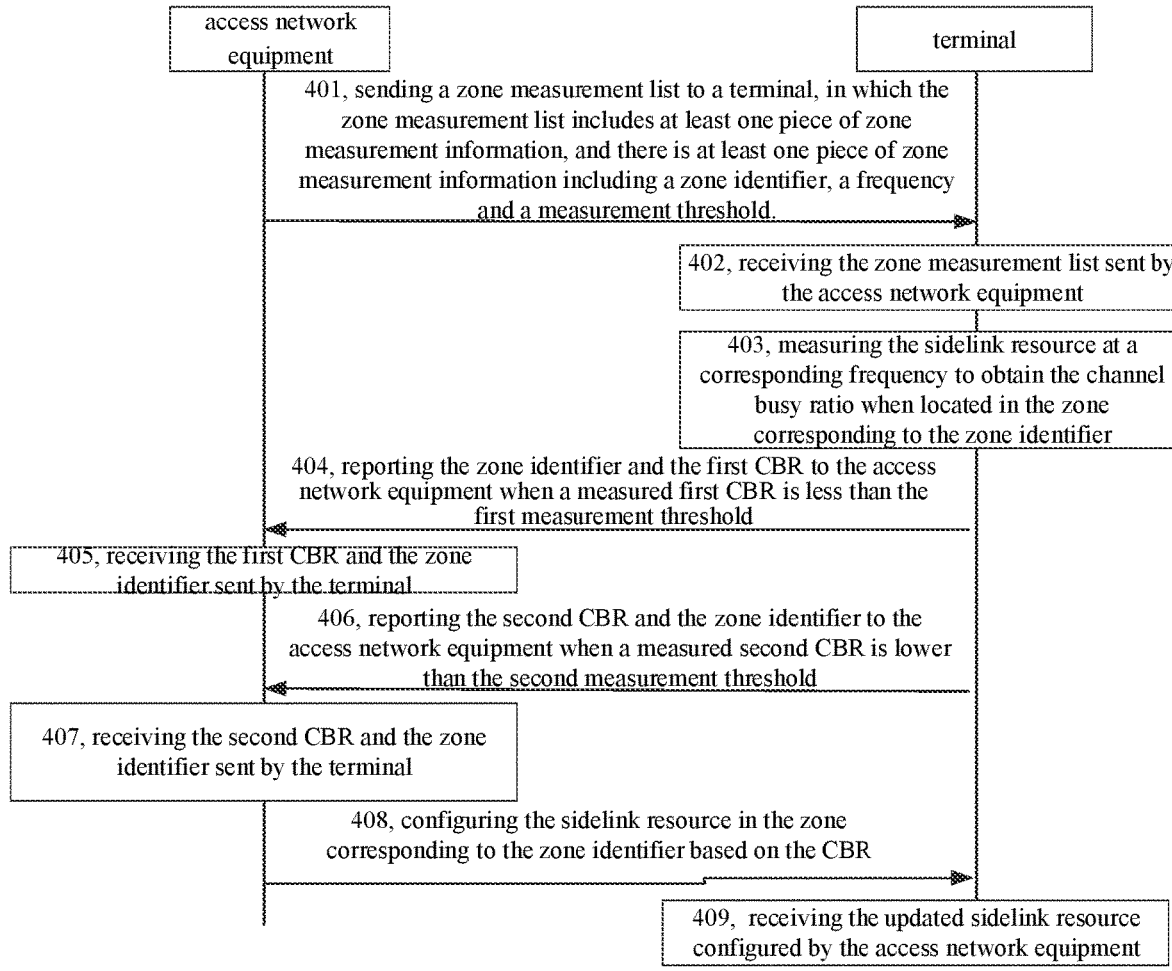
FIG. 4 is a flow chart illustrating a method for measuring a sidelink according to another embodiment of the disclosure.

FIG. 4 is a flow chart illustrating a method for measuring a sidelink according to an embodiment of the disclosure. This embodiment takes that the method is applied to the communication system illustrated in FIG. 1 as example for illustration. The method includes the following.

At block 401, an access network equipment sends a zone measurement list to a terminal. The zone measurement list includes at least one piece of zone measurement information. There is at least one piece of zone measurement information including a zone identifier, a frequency and a measurement threshold.

Alternatively, the measurement threshold includes: a first measurement threshold; or, a second measurement threshold; or, a first measurement threshold and a second measurement threshold.

The first measurement threshold is a threshold for indicating that the resource usage of the sidelink resource in the zone is relatively congested. The second measurement threshold is a threshold for indicating that the resource usage of the sidelink resource in the zone is relatively idle. The first measurement threshold is greater than the second measurement threshold.

Exemplarily, the first measurement threshold is 60% and the second measurement threshold is 20%. In embodiments, the detailed value of the first measurement threshold and the detailed value of the second measurement threshold are not limited.

Alternatively, there is at least one piece of zone measurement information which also has a measurement period configured thereon. The measurement period is configured to indicate a period for measuring the sidelink resource. For example, the measurement period is 10 milliseconds.

Table 2 illustrates an example of the zone measurement list.

TABLE 2

| Zone identifiers | Frequencies | Measurement periods | Measurement thresholds |
|---|---|---|---|
| Zone 1 | Frequency 1 | 10 ms | none |
| Zone 1 | Frequency 2 | null | 50% (first measurement threshold) |
| Zone 2 | Frequency 3 | 20 ms | 60% (first measurement threshold) 20% (second measurement threshold) |
| Zone 3 | Frequency 4 | 10 ms | 10% (second measurement threshold) |

As an example of this embodiment, when the measurement period is not configured in a piece of zone measurement information, the zone measurement information may be measured only once, or measured based on a default period. The default period is a period predefined by the communication protocol.

At block 402, the terminal receives the zone measurement list sent by the access network equipment. The zone measurement list includes at least one piece of zone measurement information. There is at least one piece of zone measurement information including the zone identifier, the frequency and the measurement period.

At block 403, the terminal measures the sidelink resource at a corresponding frequency to obtain the channel busy ratio when located in the zone corresponding to the zone identifier.

The terminal obtains its own geographical position, and determines whether its own geographical position is located in a zone indicated by the zone configuration information. The terminal measures the sidelink resource to obtain the CBR when it is located in the zone. The terminal does not measure the sidelink resource when it is not located in the zone.

At block 404, the terminal reports the first CBR and the zone identifier to the access network equipment when the measured first CBR is greater than the first measurement threshold.

At block 405, the access network equipment receives the first CBR and the zone identifier sent by the terminal, in which the first CBR is greater than a first threshold.

At block 406, the terminal reports the second CBR and the zone identifier to the access network equipment when the measured second CBR is less than the second measurement threshold.

At block 407, the access network equipment receives the second CBR and the zone identifier sent by the terminal, in which the second CBR is greater than a second threshold.

At block 408, the access network equipment configures the sidelink resource in the zone corresponding to the zone identifier based on the CBR (the first CBR and/or the second CBR).

Exemplarily, when the measurement result is configured to indicate that the resource usage in the sidelink resource pool is congested (for example, the CBR is greater than the first threshold), the available resource in the sidelink resource pool is increased. When the measurement result is configured to indicate that the resource usage in the sidelink resource pool is relatively idle (for example, the CBR is less than the second threshold), the available resource in the sidelink resource pool is reduced.

After the sidelink resource in the zone is adjusted, the access network equipment updates the configuration information of the sidelink resource pool to each terminal in the zone by using a broadcast message. That is, the access network equipment configures the updated sidelink resource pool to the terminal.

At block 409, the terminal receives the updated sidelink resource configured by the access network equipment.

In conclusion, with the method according to this embodiment, by the terminal measuring the sidelink resource in the zone and reporting the measurement result to the access network equipment, the access network equipment may dynamically adjust the sidelink resource pool based on the measurement result, such that the sidelink resource pool in each zone may be dynamically adjusted based on the number of vehicles and service types in the zone. In this way, problems of resource waste and congestion because the sidelink resource in the resource pool configured for each zone is fixed and the resource configuration may be inconsistent with the service requirement in the related art are solved.

According to the method provided by this embodiment, the terminal reports the CBR to the access network equipment only when the CBR is greater than the first measurement threshold and/or less than the second measurement threshold, thereby reducing the amount of communication data between the terminal and the access network equipment, saving the consumption of air interface resources and improving the communication efficiency.

Figure 5:
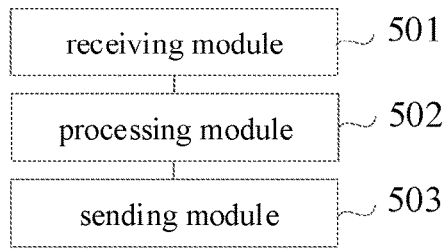
FIG. 5 is a block diagram illustrating an apparatus for measuring a sidelink according to an embodiment of the disclosure.

FIG. 5 is a block diagram illustrating an apparatus for measuring a sidelink according to an embodiment of the disclosure. The apparatus may be implemented as a part or whole of the terminal by software, hardware or a combination thereof. The apparatus includes a receiving module 501, a processing module 502 and a sending module 503.

The receiving module 501 is configured to receive zone measurement information sent by an access network equipment, in which the zone measurement information includes a zone identifier and a frequency.

The processing module 502 is configured to measure a sidelink resource at a corresponding frequency to obtain a measurement result when the terminal is located in a zone corresponding to the zone identifier.

The sending module 503 is configured to report the measurement result and the zone identifier to the access network equipment.

In some embodiments, the receiving module 501 is configured to receive a zone measurement list sent by the access network equipment. The zone measurement list includes at least one piece of zone measurement information.

In some embodiments, the zone measurement list is carried in a reconfiguration message.

In some embodiments, the measurement result includes a channel busy ratio (CBR).

In some embodiments, the zone measurement information further includes a measurement period; the sending module 503 is configured to periodically report the measurement result and the zone identifier measured based on the measurement period to the access network equipment.

In some embodiments, the zone measurement information further includes a first measurement threshold and/or a second measurement threshold; the receiving module 501 is configured to report the measurement result and the zone identifier to the access network equipment when the measurement result is greater than the first measurement threshold; or to report the measurement result and the zone identifier to the access network equipment when the measurement result is less than the second measurement threshold.

In some embodiments, the receiving module 501 is further configured to receive an updated sidelink resource configured by the access network equipment. The updated sidelink resource is obtained by the access network equipment configuring the sidelink resource in the zone corresponding to the zone identifier based on the measurement result.

In conclusion, with the apparatus for measuring a sidelink according to this embodiment, by measuring the sidelink resource in the zone and reporting the measurement result to the access network equipment, the access network equipment may dynamically adjust the sidelink resource pool based on the measurement result, such that the sidelink resource pool in each zone may be dynamically adjusted based on the number of vehicles and service types in the zone. In this way, problems of resource waste and congestion because the sidelink resource in the resource pool configured for each zone is fixed and the resource configuration may be inconsistent with the service requirement in the related art are solved.

Figure 6:
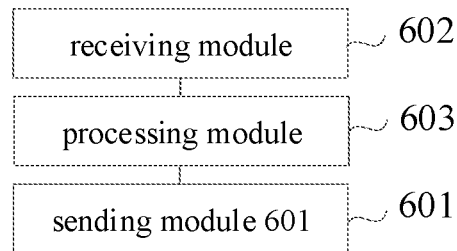
FIG. 6 is a block diagram illustrating an apparatus for measuring a sidelink according to another embodiment of the disclosure.

FIG. 6 is a block diagram illustrating an apparatus for measuring a sidelink according to another embodiment of the disclosure. The apparatus may be implemented as a part or whole of the terminal by software, hardware or a combination thereof. The apparatus includes: a sending module 601, a receiving module 602 and a processing module 603.

The sending module 601 is configured to send zone measurement information to a terminal, in which the zone measurement information includes a zone identifier and a frequency.

The receiving module 602 is configured to receive a measurement result and the zone identifier sent by the terminal, in which the measurement result is obtained by the terminal measuring a sidelink resource on a corresponding frequency when located in a zone corresponding to the zone identifier.

The processing module 603 is configured to configure the sidelink resource in the zone corresponding to the zone identifier based on the measurement result.

In some embodiments, the sending module 601 is configured to send a zone measurement list to the terminal. The zone measurement list includes at least one piece of zone measurement information.

In some embodiments, the zone measurement list is carried in a reconfiguration message.

In some embodiments, the measurement result includes a channel busy ratio (CBR).

In some embodiments, the zone measurement information further includes a measurement period; the receiving module 602 is configured to receive the measurement result and the zone identifier periodically reported by the terminal. The measurement result is measured based on the measurement period.

In some embodiments, the zone measurement information further includes a first measurement threshold and/or a second measurement threshold; the receiving module 602 is configured to receive the measurement result and the zone identifier reported by the terminal. The measurement result is greater than the first measurement threshold, or the measurement result is less than the second measurement threshold.

In conclusion, with the apparatus for measuring a sidelink according to this embodiment, by the terminal measuring the sidelink resource in the zone and reporting the measurement result to the access network equipment, the access network equipment may dynamically adjust the sidelink resource pool based on the measurement result, such that the sidelink resource pool in each zone may be dynamically adjusted based on the number of vehicles and service types in the zone. In this way, problems of resource waste and congestion because the sidelink resource in the resource pool configured for each zone is fixed and the resource configuration may be inconsistent with the service requirement in the related art are solved.

Figure 7:
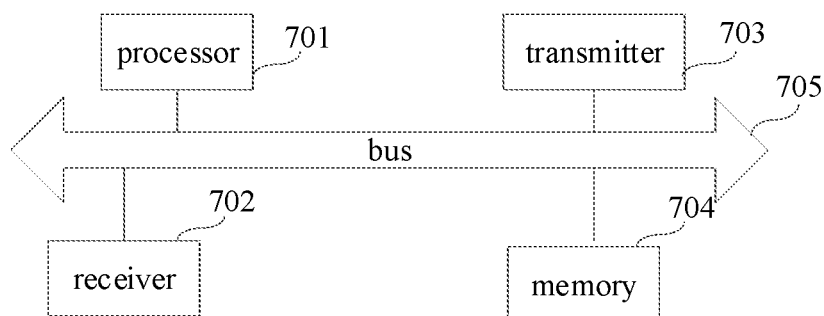
FIG. 7 is a block diagram illustrating a terminal according to an embodiment of the disclosure.

FIG. 7 is a block diagram illustrating a terminal according to an embodiment of the disclosure. The terminal includes: a processor 701, a receiver 702, a transmitter 703, a memory 704 and a bus 705.

The processor 701 includes one or more processing cores. The processor 701 is configured to execute various functional applications and information processing by operating software programs and modules.

The receiver 702 and the transmitter 703 may be implemented as a communication component. The communication component may be a communication chip.

The memory 704 is connected to the processor 701 via a bus 705.

The memory 704 may be configured to store at least one instruction. The processor 701 is configured to execute the at least one instruction to implement each action in the above method embodiment.

In addition, the memory 104 may be implemented by any type of volatile or nonvolatile memory device or a combination thereof. The volatile or nonvolatile memory device includes, but not limited to, a magnetic disk or optical disk, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM)

In an embodiment, there is also provided a non-transitory computer readable storage medium including instructions, such as a memory including instructions. The instructions may be executed by the processor of the terminal to implement the method for measuring a sidelink performed by the terminal in the above methods for measuring a sidelink. For example, the non-transitory computer readable storage medium may be an ROM, an RAM, a CD-ROM, a magnetic tape, a floppy disk, an optical data storage device, etc.

There is the non-transitory computer readable storage medium. When the instructions in the non-transitory computer readable storage medium are executed by the terminal, the terminal is enabled to execute the method for measuring a sidelink.

Figure 8:
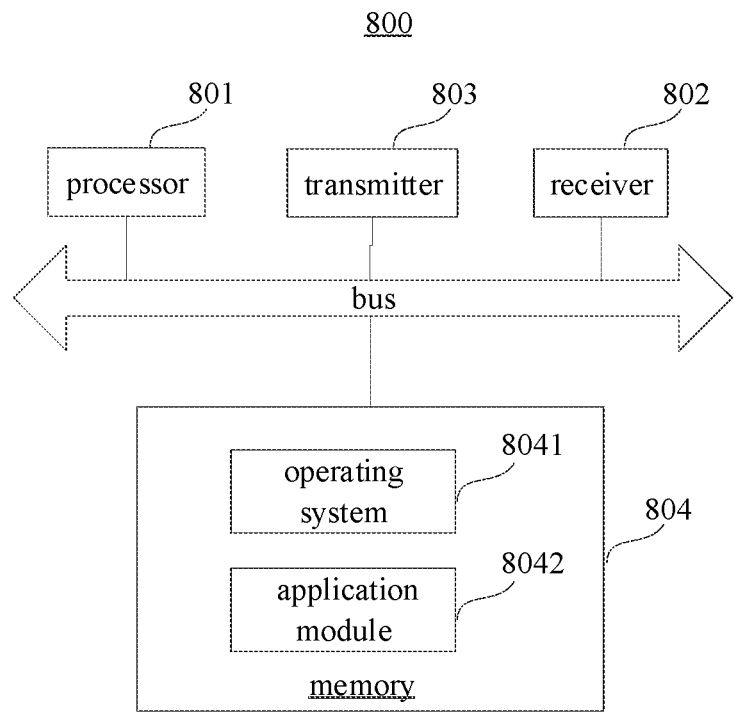
FIG. 8 is a block diagram illustrating an access network equipment according to an embodiment of the disclosure.

FIG. 8 is a block diagram illustrating an access network equipment 800 according to an embodiment of the disclosure. The access network equipment 800 may be a base station.

The access network equipment 800 may include a processor 801, a receiver 802, a transmitter 803 and a memory 804. The receiver 802, the transmitter 803 and the memory 804 are respectively connected to the processor 801 through buses.

The processor 801 includes one or more processing cores. The processor 801 is configured to execute the method executed by the access network equipment in the methods for measuring a sidelink according to embodiments of the disclosure by operating a software program and a module. The memory 804 may be configured to store the software program and the module. In detail, the memory 804 may be configured to store an operating system 8041 and an application module 8042 required by at least one function. The receiver 802 is configured to receive communication data sent by other devices. The transmitter 803 is configured to send communication data to other devices.

An embodiment of the disclosure also provides a system (or communication system) for measuring a sidelink. The system includes a terminal and an access network equipment.

The terminal includes the apparatus for measuring a sidelink provided in this embodiment illustrated in FIG. 5.

The access network equipment includes the apparatus for measuring a sidelink provided in this embodiment illustrated in FIG. 6.

An embodiment of the disclosure also provides a system (or communication system) for measuring a sidelink. The system for receiving a downlink signal includes a terminal and access network equipment.

The terminal includes the terminal provided in the embodiment illustrated in FIG. 7.

The access network equipment includes the access network equipment provided in the embodiment illustrated in FIG. 8.

An embodiment of the disclosure also provides a computer readable storage medium. The computer readable storage medium has at least one instruction, at least one program, a code set or an instruction set stored thereon. The at least one instruction, the at least one program, the code set or the instruction set is loaded and executed by the processor to implement the steps performed by the terminal or the access network equipment in the method for measuring a sidelink provided by the above method embodiments.

It should be understood that, the term "a plurality of" herein means two or more. The term "and/or" describes an association relationship of associated objects, which means that there can be three kinds of relationships. For example, A and/or B can mean that there are three situations: A alone, A and B at the same time, and B alone. The character "/" generally indicates that context objects are an "or" relationship.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that, the disclosure is not limited to the exaction construction that has been described above and illustrated in the accompanying drawings, and that various modifications and changes may be made without departing from the scope thereof. The scope of the disclosure only is limited by the appended claims.

What is claimed is:

1. A method for measuring a sidelink, comprising:
    receiving, by a terminal, zone measurement information sent by an access network equipment, wherein the zone measurement information comprises a zone identifier and a frequency;
    when the terminal is located in a zone corresponding to the zone identifier, measuring, by the terminal, a sidelink resource at the corresponding frequency to obtain a measurement result;
    reporting, by the terminal, the measurement result and the zone identifier to the access network equipment; and
    receiving, by the terminal, an updated sidelink resource configured by the access network equipment, wherein the updated sidelink resource is obtained by the access network equipment configuring the sidelink resource in the zone corresponding to the zone identifier based on the measurement result.

2. The method of claim 1, wherein receiving, by the terminal, the zone measurement information sent by the access network equipment comprises:
    receiving, by the terminal, a zone measurement list sent by the access network equipment, wherein the zone measurement list comprises at least one piece of zone measurement information.

3. The method of claim 2, wherein the zone measurement list is carried in a reconfiguration message.

4. The method of claim 1, wherein the measurement result comprises a channel busy ratio (CBR).

5. The method of claim 1, wherein the zone measurement information further comprises a measurement period; and
    reporting, by the terminal, the measurement result and the zone identifier to the access network equipment comprises:
    periodically reporting, by the terminal, the zone identifier and the measurement result measured based on the measurement period to the access network equipment.

6. The method of claim 1, wherein the zone measurement information further comprises at least one of a first measurement threshold and a second measurement threshold;
    reporting, by the terminal, the measurement result and the zone identifier to the access network equipment comprises:
    reporting, by the terminal, the measurement result and the zone identifier to the access network equipment when the measurement result is greater than the first measurement threshold; or
    reporting, by the terminal, the measurement result and the zone identifier to the access network equipment when the measurement result is less than the second measurement threshold.

7. A method for measuring a sidelink, comprising:
    sending, by an access network equipment, zone measurement information to a terminal, wherein the zone measurement information comprises a zone identifier and a frequency;
    receiving, by the access network equipment, a measurement result and the zone identifier sent by the terminal, wherein the measurement result is obtained by the terminal measuring a sidelink resource at the corresponding frequency when located in a zone corresponding to the zone identifier;
    configuring, by the access network equipment, the sidelink resource in the zone corresponding to the zone identifier based on the measurement result; and
    configuring, by the access network equipment, an updated sidelink resource to the terminal.

8. A base station, comprising:
    a processor; and
    a transceiver, connected to the processor;
    wherein the processor is configured to load and execute executable instructions to implement the method for measuring the sidelink according to claim 7.

9. The method of claim 7, wherein sending, by the access network equipment, the zone measurement information to the terminal comprises:
    sending, by the access network equipment, a zone measurement list to the terminal, wherein the zone measurement list comprises at least one piece of zone measurement information.

10. The method of claim 9, wherein the zone measurement list is carried in a reconfiguration message.

11. The method of claim 7, wherein the measurement result comprises a channel busy ratio (CBR).

12. The method of claim 7, wherein the zone measurement information further comprises a measurement period; and receiving, by the access network equipment, the measurement result and the zone identifier sent by the terminal comprises:

receiving, by the access network equipment, the zone identifier and the measurement result periodically reported by the terminal, wherein the measurement result is measured based on the measurement period.

13. The method of claim 7, wherein the zone measurement information further comprises at least one of a first measurement threshold and a second measurement threshold; and receiving, by the access network equipment, the measurement result and the zone identifier sent by the terminal comprises:

receiving, by the access network equipment, the measurement result and the zone identifier reported by the terminal; wherein the measurement result is greater than the first measurement threshold, or the measurement result is less than the second measurement threshold.

14. A terminal, comprising:

a processor; and a transceiver, connected to the processor;

wherein the processor is configured to load and execute executable instructions to implement a method for measuring a sidelink, the method comprising:

receiving zone measurement information sent by an access network equipment, wherein the zone measurement information comprises a zone identifier and a frequency;

when the terminal is located in a zone corresponding to the zone identifier, measuring a sidelink resource at the corresponding frequency to obtain a measurement result;

reporting the measurement result and the zone identifier to the access network equipment; and receiving an updated sidelink resource configured by the access network equipment, wherein the updated sidelink resource is obtained by the access network equipment configuring the sidelink resource in the zone corresponding to the zone identifier based on the measurement result.

15. The terminal of claim 14, wherein the processor is configured to receive a zone measurement list sent by the access network equipment, wherein the zone measurement list comprises at least one piece of zone measurement information.

16. The terminal of claim 14, wherein the measurement result comprises a channel busy ratio (CBR).

17. The terminal of claim 14, wherein the zone measurement information further comprises a measurement period; and the processor is configured to:

periodically report the zone identifier and the measurement result measured based on the measurement period to the access network equipment.

18. The terminal of claim 14, wherein the zone measurement information further comprises a first measurement threshold and/or a second measurement threshold;

the processor is configured to:

report the measurement result and the zone identifier to the access network equipment when the measurement result is greater than the first measurement threshold; or report the measurement result and the zone identifier to the access network equipment when the measurement result is less than the second measurement threshold.

* * * * *